Sept. 8, 1970 R. F. KOONTZ 3,528,016

CAPACITOR BIASING FOR VARIABLE REMOTE CONTROL OF PULSE DELAYS

Filed Dec. 13, 1967

INVENTOR.
ROLAND F. KOONTZ
BY
Roland A. Anderson
ATTORNEY.

United States Patent Office 3,528,016
Patented Sept. 8, 1970

3,528,016
CAPACITOR BIASING FOR VARIABLE REMOTE CONTROL OF PULSE DELAYS

Roland F. Koontz, Menlo Park, Calif., assignor to the United States of America as represented by the United States Atomic Energy Commission Filed Dec. 13, 1967, Ser. No. 690,245
Int. Cl. H03k *17/28*
U.S. Cl. 328—56 5 Claims

ABSTRACT OF THE DISCLOSURE

Variable remote control pulse delay circuit in which a capacitor is connected across a pulse source for integrating each pulse and delaying the rise of each pulse to a predetermined voltage level. The capacitor initially discharged is biased with a variable DC voltage prior to application of each pulse voltage so that the time required for the additive voltages to attain a predetermined voltage level is variably controlled.

BACKGROUND OF THE INVENTION

The present invention relates generally to pulse delay circuits, and more particularly, it relates to variable DC biasing of a delay circuit capacitor to controllably delay pulse times.

The invention disclosed herein was made under, or in, the course of Contract No. AT(04–3)–400 with the United States Atomic Energy Commission.

It is known to provide pulse delays by means of RC integrating circuits wherein a capacitor is charged to a predetermined voltage level and this voltage applied to a trigger circuit responsive only to voltages above the predetermined level for producing a delayed output. Examples of this type of pulse delay circuit may be found in U.S. Pat. No. 3,244,907 and U.S. Pat. No. 3,073,972. Adjustable pulse delays for such circuits may be provided by including a variable resistance or capacitance for adjusting the RC time constant of the circuit. However, it is required for some pulse systems, especially a high frequency pulse system, as for example the gun pulser circuitry of a long linear accelerator, that pulse delays be remotely controlled over distances more than one mile, or otherwise as in telemetry systems. This function in the past has been accomplished by using a motor-driven potentiometer servo system to remotely manipulate a variable resistor or capacitor to adjust the RC time constant of a pulse delay circuit. In this type of system, the high frequency components of the pulses must pass through the variable resistor and capacitor. To avoid severe attenuation of the pulses, the variable resistor or capacitor must be mounted in the immediate proximity of the rest of the circuitry. However, the elements of a broad band circuit must be capable of handling the high frequency components of fast pulses, and generally such circuits are susceptible to malfunctioning in the presence of the noise that normally radiates from servo systems. Consequently, the components of such systems must be specially chosen and carefully located and shielded in extensive "de-bugging" operations to prevent interference with the high frequency circuits.

SUMMARY OF THE INVENTION

According to the present invention, a capacitor is connected across the output of a pulse source for integrating and thereby delaying pulses from the source. The delay is made adjustable by including a selected variable DC bias voltage source in series with the capacitor. Means are provided for discharging the capacitor during the interpulse period so that each pulse charge accumulated on the capacitor results in a voltage which is simply added to the DC bias voltage. The total voltage across the capacitor and bias voltage source may be applied to the input of a trigger circuit, e.g., having a gate circuit which is responsive to a predetermined voltage level to produce an output pulse. Delay of the output pulse is adjustable simply by varying the DC bias voltage so that more or less time is required to charge the capacitor to attain the total voltage equal to the predetermined voltage necessary to activate the trigger circuit. In supplying the DC bias voltage to the pulse circuitry, very little power is consumed by the pulse circuitry or in the leads to the circuitry. Since there is little power loss or attenuation of the DC bias voltage, no specially designed lines, amplifiers, or other complex equipment are required to transmit the bias voltage over long distances. The bias voltage controls, therefore, may be remotely located with respect to high frequency circuitry; the bias voltage level may be controlled with conventional potentiometer components; and the bias voltage, if need be, can be transmitted long distances over a simple wire pair transmission line or by a simple telemetry circuit.

It is an object of the invention to remotely control high frequency pulse delay circuitry with a DC voltage.

Another object is to vary the charging time required for a fixed time constant RC integrating circuit to attain a predetermined voltage.

Other objects and advantageous features of the invention will be apparent in a description of a specific embodiment thereof, given by way of example only, to enable one skilled in the art to readily practice the invention, and described hereinafter with reference to the accompanying drawing.

DESCRIPTION OF AN EMBODIMENT

Figure 1:
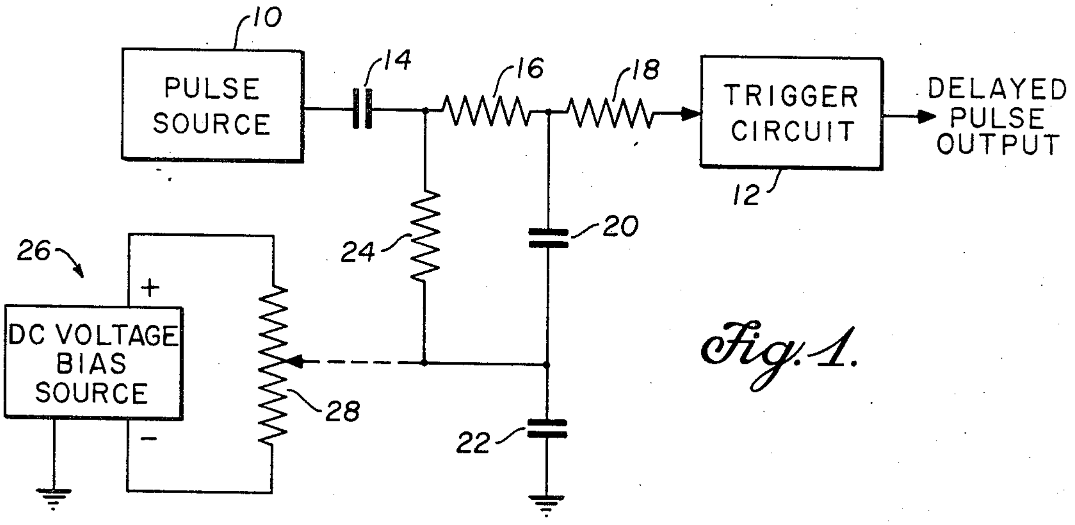
FIG. 1 is a diagram of a system including an integrating capacitor for remotely controlling the delay of high frequency pulses, according to the invention.

An embodiment of the invention is shown in FIG. 1 wherein the output of a pulse source 10 is connected to the input of a gate or trigger circuit 12 through a capacitor 14 in series with a pair of resistors 16 and 18. A pair of serially connected capacitors (an integrating capacitor 20 and a stabilizing capacitor 22) are connected between ground and the midpoint of resistors 16 and 18. A discharge resistor 24 is serially connected with the resistor 16 across the capacitor 20 to provide a discharge path for the capacitor 20. A DC bias voltage source 26, including a variable resistance 28, is connected in series with the capacitor 20 to ground.

In operation, the trigger circuit 12 is set for triggering at a predetermined voltage $V_p$. Pulses applied from the pulse source 10 to the circuit 12 are integrated and thereby delayed by the capacitor 20. The delay is due to the time required for the pulse to charge the capacitor 20, to a voltage above ground equivalent to the voltage $V_p$. Provision is made to adjust this delay by the inclusion of the DC bias voltage source 26 in series with the capacitor 20. The voltage at the upper ends of the capacitor 20 may be adjusted by means of the source 26 toward or away from the predetermined voltage $V_p$ at the input of the trigger circuit 12. Thus, upon adjustment of the bias voltage toward the voltage $V_p$, there is less of a delay between a pulse from the pulse source 10 and the corresponding trigger circuit output pulse, since the voltage on the capacitor 20 will rise to the voltage $V_p$ in a shorter time interval. Conversely, adjusting the bias voltage away from the voltage $V_p$ results in a longer time delay for the pulse from the source 10 to charge the capaci-20 to trigger the circuit 12.

Figure 2:
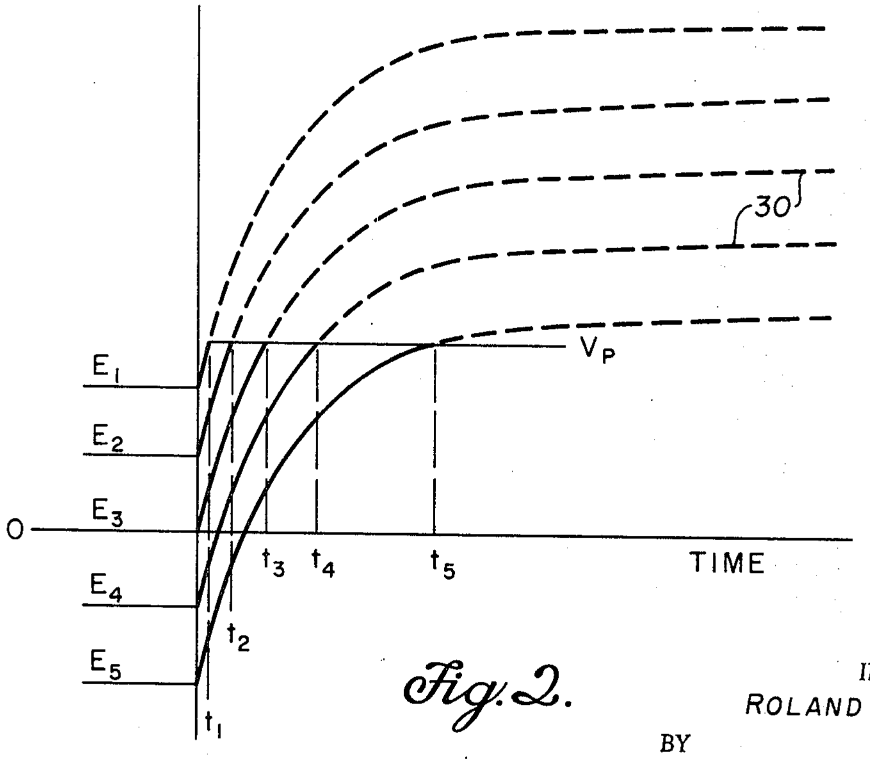
FIG. 2 is a family of charging curves illustrating the time delays obtained for corresponding DC voltage bias levels applied to the integrating capacitor of FIG. 1.

A family of RC charging curves 30 for the resistor 16 and capacitor 20 are shown in FIG. 2. Since the resistor 16 and capacitor 20 have fixed values, the charging curves 30 have the same shape regardless of the point at which the capacitor 20 is biased. Several bias voltages, $E_1$–$E_5$, are indicated in FIG. 2. Charging curves having identical slopes extend from each bias level $E_1$–$E_5$ to the predetermined voltage level $V_p$. It will be observed that as the bias voltage level is moved toward the predetermined voltage level $V_p$, the time interval necessary to reach the voltage $V_p$ becomes shorter. Thus the interval $t_1$ is very short, since the corresponding bias voltage level $E_1$ is very close to voltage $V_p$. Conversely, as the bias voltage level is lowered, it takes a longer time for the capacitor 20 to be charged to the voltage $V_p$. As for example, the lowest bias level shown is $E_5$ and the corresponding time interval for charging the capacitor 20 to the voltage $V_p$ is the long interval $t_5$.

The variable resistance 28 may be remotely located from the rest of the circuitry. It will be seen that the stabilizing capacitor 22 is charged and maintained at the bias voltage level at which the variable resistance 28 is set, and further, that no part of the circuit consumes any significant amount of DC power from the bias source 26. The DC bias voltage, therefore, may be transmitted over the simplest kinds of transmission lines, even at great distances, and the pulse delay will still be accurately and sensitively controlled.

A circuit embodiment exemplifying the invention was constructed with components having the following values:

Capacitor 14—0.47 microfarad.
Resistor 16—1K ohm.
Resistor 18—681 ohms.
Capacitor 20—parallel-connected capacitors of 750 microfarads and 100 microfarads.
Capacitor 22—0.47 microfarad.
Resistor 24—1K ohm.

The variable resistance 28 was a 500-ohm potentiometer, and the DC bias voltage source 26 was a Zener stabilized power supply having opposite poles at +5.1 volts and −5.1 volts. The variable resistance 28 was servo controlled and remotely located from the pulse circuitry at a distance of approximately ten feet. Pulses from the source 10 had a duration of 3 microseconds, a peak of +10 volts, and an interpulse period of 3 milliseconds. The trigger circuit was biased at a predetermined voltage of +6 volts. Pulse delays between the pulses from the source 10 and the output pulse from the circuit 12 were obtained with delays ranging from 0 to 2 microseconds. The DC bias voltage was applied from the resistance 28 to the capacitor 20 over a twisted pair type of transmission line.

While an embodiment of the invention has been shown and described, further embodiments or combinations of those described herein will be apparent to those skilled in the art without departing from the spirit of the invention or from the scope of the appended claims.

I claim:

1. A circuit for delaying the rise of pulses to a predetermined voltage, comprising:
a capacitor having first and second plates;
a resistance connected to said first plate of said capacitor;
a DC bias voltage source having first and second terminals, said first terminal being connected to said second plate for applying a bias voltage to said capacitor, said source including means for varying said bias voltage to produce a range of steady DC voltages;
means for applying pulses to said capacitor through said resistance;
means for discharging said capacitor after the occurrence of each of said pulses;
a first output connection from said first plate of said capacitor; and
a second output connection from said second terminal of said source, each of said pulses applied to said capacitor being delayed from rising across said first and second output connections to said predetermined voltage for a period that is dependent on the voltage across said first and second terminals of said source, said period of delay being variable by adjustment of said source voltage.

2. The circuit of claim 1, wherein said means for varying said bias voltage is remotely located from said capacitor and further includes elongated electrical conduction means for connecting said bias voltage varying means to said capacitor and said second output connection.

3. The circuit of claim 2, wherein said elongated means is a simple wire pair transmission line.

4. The circuit of claim 1, further including a trigger circuit having an input coupled to said output connections, said trigger circuit input being biased at said predetermined voltage, said trigger circuit being operable in response to a rise in the total voltage across said bias source and said capacitor equal to said predetermined voltage to generate an output pulse.

5. The circuit of claim 1, further including capacitive means connected in parallel with said bias voltage source for stabilizing the bias voltage applied to said capacitor.

References Cited

UNITED STATES PATENTS

| | | | |
|---|---|---|---|
| 2,529,007 | 1/1951 | Blok et al. | 328—67 XR |
| 2,735,007 | 2/1956 | McCurdy | 328—67 XR |
| 2,891,155 | 6/1959 | Carr et al. | 328—67 |
| 2,976,487 | 3/1961 | Cohen | 307—293 XR |
| 2,998,532 | 8/1961 | Smeltzer | 307—293 XR |
| 3,213,292 | 10/1965 | Taylor | 307—293 XR |

STANLEY T. KRAWCZEWICZ, Primary Examiner

U.S. Cl. X.R.

307—235, 293; 328—127